Sept. 24, 1935.　　　G. T. PFLEGER　　　2,015,233
SEAL FOR BEARING HOUSINGS
Filed May 22, 1933
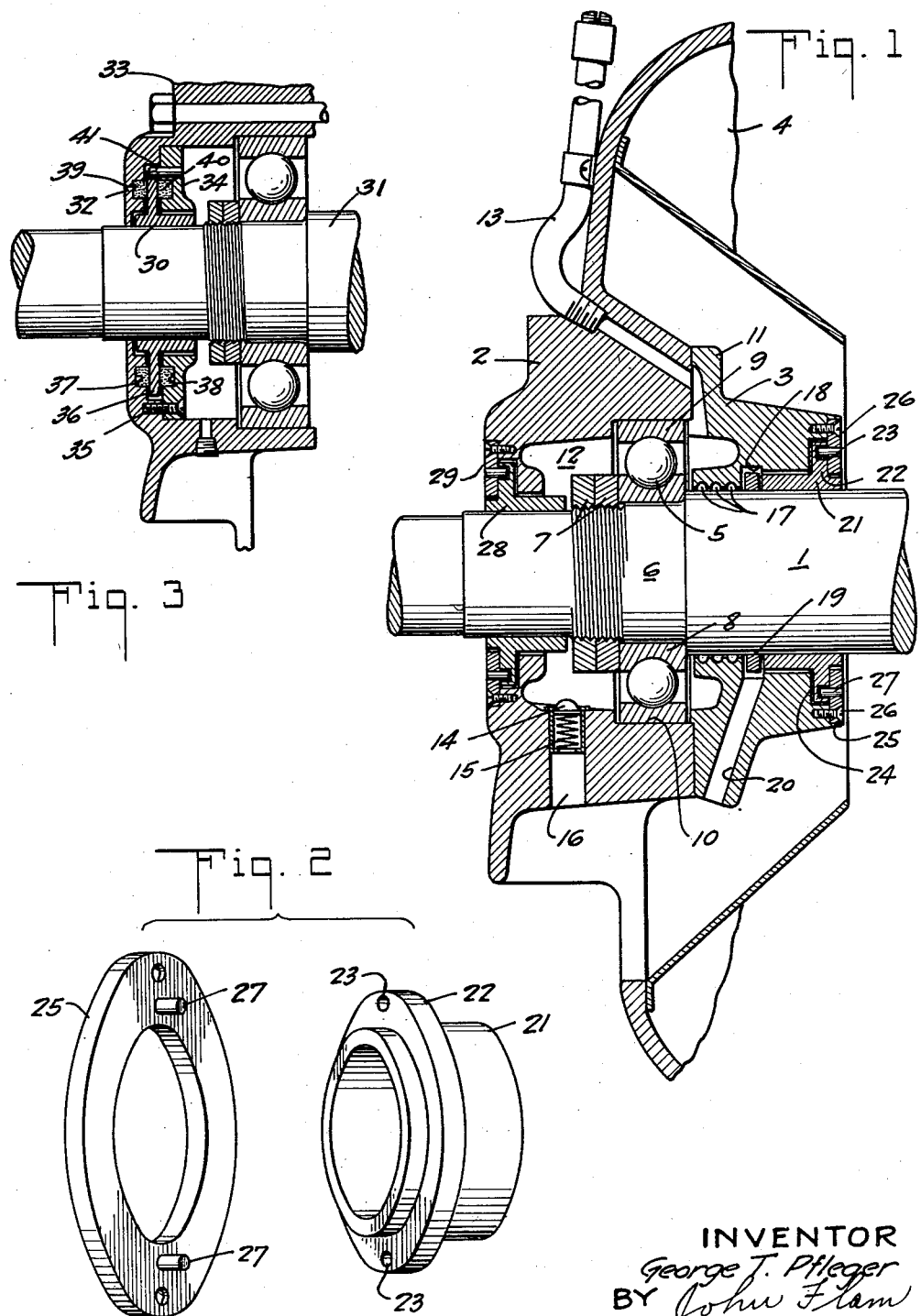
INVENTOR
George T. Pfleger
BY John Flam
ATTORNEY Patented Sept. 24, 1935

2,015,233

UNITED STATES PATENT OFFICE 2,015,233

SEAL FOR BEARING HOUSINGS

George T. Pfleger, Los Angeles, Calif., assignor to United States Electrical Manufacturing Company, Los Angeles, Calif., a corporation of California Application May 22, 1933, Serial No. 672,150

5 Claims. (Cl. 286—7)

This invention relates to a device for sealing a bearing structure against the entry of foreign matter, and to prevent the egress of lubricant.

Bearing structures are usually supported in a housing. The shaft that is being supported extends either into or through the housing, which may be kept at least partly filled with lubricant. When a ball or roller bearing is used in place of an ordinary journal bearing, the inner and outer races of the bearing structure are usually supported respectively on the shaft and on the housing.

This housing is provided with a covering member or members, extending around the shaft where it enters the housing. Grease or equivalent lubricant can thus be packed and retained in the housing. It has been customary in the past to utilize a washer made from felt or other yielding fabric, around the shaft where it enters the housing, the washer engaging the periphery of the shaft to exclude foreign matter from entering between the shaft and the cooperating parts of the housing.

Such felt seals have several disadvantages. If the seals are made tight enough or long enough to provide effective protection for an indefinite period, excess friction occurs. There is also difficulty in getting just enough lubricant to the felts so that they do not burn. Furthermore, as the shaft wears or deflects, the felt is distorted or urged aside in such a way as to lose its effectiveness as a seal.

It is one of the objects of this invention to obviate these difficulties, and particularly by the aid of a metal sealing member that is conformable to the flexing of the shaft and that yet maintains a good seal.

It is another object of the invention to provide a seal that is capable of use for long periods, and that is easy to manufacture and install.

This invention possesses many other advantages, and has other objects which may be made more easily apparent from a consideration of several embodiments of the invention. For this purpose there is shown a few forms in the drawing accompanying and forming part of the present specification. These forms shall now be described in detail, illustrating the general principles of the invention; but it is to be understood that this detailed description is not to be taken in a limiting sense, since the scope of the invention is best defined by the appended claims.

Referring to the drawing:

Figure 1 is a sectional view of a structure including a bearing housing and a shaft extending therethrough, in which the invention is utilized;

Fig. 2 is a perspective view of the metal sealing member and its retaining ring; and Fig. 3 is a fragmentary view similar to Fig. 1, but showing a modified form of the invention.

In Fig. 1 there is illustrated a shaft 1 which extends entirely through a bearing housing formed of two members 2 and 3. The member 2 of the bearing housing is shown in this instance as integral with an end frame 4 of the source of motion, for shaft 1, such as an electric motor.

The shaft 1 is rotatably supported in the bearing housing 2—3, as by the aid of a ball bearing structure 5. The inner race of this ball bearing structure is supported on a reduced portion 6 of shaft 1, over which it is forcibly fitted. One or more retaining nuts, such as 7, threaded on the reduced portion of the shaft, holds the inner race 8 against removal. The outer race 9 is accommodated in an internal cylindrical surface 10 of the member 2.

The member 3 has a flange 11 extending over the inner end surface of the member 2, and is fastened thereto in any appropriate manner. A lubricant chamber 12 is formed in the housing by the aid of members 2 and 3. This chamber 12 may be supplied, as through a conduit 13, with lubricant such as grease. This lubricant fills the entire chamber 12 and it is desired to retain it from passage to the outside of the housing, except when it is desired to do so for renewing the lubricant. Thus if sufficient pressure is exerted on the lubricant by the aid of conduit 13, a check valve 14 is depressed against the action of a compression spring 15, and the lubricant can pass out through the passageway 16 to the exterior of the housing.

Furthermore, in order to keep the lubricant from travelling along shaft 1, a series of grooves 17 may be provided on the inner surface of member 3. All of these grooves serve to collect and pass the lubricant to a deep annular groove 18, having an ejector ring 19, acting upon rotation to pass whatever lubricant may have collected in the passageway 20, to the outside of the housing.

It is customary to seal the bearing housing against ingress of foreign matter, around the rotating shaft 1, as by the aid of felt washers, rubbing against the periphery of shaft 1. These felt washers, however, produce considerable friction unless they are properly oiled or lubricated. Some difficulty is also usually encountered in getting just the right amount of lubricant to these washers. Furthermore, as these "felts" wear in time, the sealing effect may be considerably reduced. Again these felt washers cannot have a long sealing surface on account of the friction produced by them.

In the present instance, felt seals are obviated. Instead a floating metallic seal is provided by the aid of a metal sealing member 21. This sealing member is shown to best advantage at the right hand side of Fig. 2. It engages the shaft 1, having a good running clearance therewith of about .002 inches. Furthermore, it is so supported on the member 3 of the housing as to make it possible for it to aline itself to any deflected position of the shaft. In other words, the member 21 is not rigidly fastened to the housing, but instead is floatingly supported.

For this purpose the member 21 has a flange 22 in which there may be one or more holes 23, which need not extend entirely through the flange. In the present instance two such holes disposed at diametrically opposite points are indicated. The flange 22 is arranged to abut a surface 24 of member 3 to be in floating sealing contact therewith. It is held in this position by a retaining ring 25 (Fig. 2) which extends over the edge of flange 22. It may be supported on member 3 as by the aid of a plurality of screws 26. The retaining ring 25 carries pins 27 adapted to engage in the holes 23 with sufficient clearance to give the member 21 some degree of freedom.

In order to reduce the friction as much as possible, the sealing member 21 is preferably made of self-lubricating alloy, such as oilless bronze. As shaft 1 deflects or wears, the member 21 can accommodate itself to the varying conditions. This is possible because of the clearance provided between the member 21 and the other portions of the mechanism, such as shaft 1, bearing housing member 3, holes 23, pins 27, and retaining ring 25. Clearances of the order of .002 inch or more are provided, not only between member 21 and shaft 1, but also between the housing member 3 and retaining ring 25, for flange 22; as well as between pins 27 and holes 23.

If the shaft 1 extends entirely through the bearing housing as shown in Fig. 1, a floating ring 28 similar to the floating ring 21 may be provided at the other end of the housing. This ring 28 can also be made of self-lubricating alloy and can have the same degree of clearance. It can be held in floating relation to the housing member 2, as by the aid of the retaining ring 29, similar in all respects to retaining ring 25.

In the form shown in Fig. 3, additional sealing is provided by the aid of one or more felt rings. These rings, however, do not act upon any rotating surface, but only upon a relatively stationary surface of the sealing ring.

Thus a metal sealing member 30 is shown in sealing cooperation with the shaft 31. This sealing ring 30 is in this instance held between a flange 32 of the housing member 33 and a retaining ring 34 disposed inside of the housing member 33. Retaining ring 34 can be fastened as by the aid of screws 35 to the housing member 33 and can overlie the edge of the flange 36 of the sealing member 30.

In this case the flange 36 is quite deep and extends beyond the annular recesses 37 and 38 formed respectively in the flange 32 and in the ring 34. In these annular recesses may be accommodated the "felts" 39 and 40 which are in the form of annular yielding rings contacting with opposite surfaces of the member 30.

In this case also, the retaining ring 34 can be provided with one or more pins 41 adapted to engage in corresponding slots in the edge of flange 36 to prevent rotation of member 30, while yet permitting this member to float.

The felt members 39 and 40 serve definitely to interrupt any communication from the inside to the outside of the housing, since they are in sealing relation with the flange 36. Since this flange 36 is not rotating, it is not necessary to lubricate felts 39 and 40.

As in the first form described, the metal member 30 can have sufficient clearance with respect to shaft 31 as not to hinder its rotation while yet effectively preventing the entry of foreign matter into the housing. Similar clearances can be maintained between flange 36 and the cooperating parts 32 and 34.

I claim:

1. In a device for sealing a shaft in a bearing housing, a metal ring in sealing relation with the shaft and with the housing but with sufficient axial and radial clearance to permit substantial movement in both directions, and means to prevent rotation of the ring with respect to the housing.

2. In a device for sealing a shaft in a bearing housing, a metal ring having a long cylindrical surface in sealing relation with the shaft, as well as another surface in sealing relation with the housing but with sufficient axial and radial clearance to permit substantial movement in both directions, and means to prevent rotation of the ring with respect to the housing.

3. In a device for sealing a shaft in a bearing housing, a metal ring in sealing relation with the shaft and with the housing but with sufficient axial and radial clearance to permit substantial movement in both directions, and means to prevent rotation of the ring with respect to the housing, comprising a slot and pin connection between the housing and the ring.

4. In a device for sealing a shaft in a bearing housing, a metal ring in sealing relation with the shaft and with the housing but with sufficient axial and radial clearance to permit substantial movement in both directions, yielding means for sealing the clearance space between the ring and the housing, and means to prevent rotation of the ring with respect to the housing.

5. In a device for sealing a shaft in a bearing housing, a metal ring in sealing relation with the shaft and having a flange in sealing relation with the housing but with sufficient axial and radial clearance to permit substantial movement in both directions, a yielding sealing ring in contact with the flange and with the housing, and means to prevent rotation of the ring with respect to the housing.

GEORGE T. PFLEGER.